Aug. 27, 1968   R. NOUEL   3,398,436
AUTOMATIC REGULATOR VALVE FOR INJECTION MOULDING
Filed March 22, 1966   2 Sheets-Sheet 1

INVENTOR
ROBERT NOUEL
BY
Cushman, Darby & Cushman
ATTORNEYS

Aug. 27, 1968  R. NOUEL  3,398,436
AUTOMATIC REGULATOR VALVE FOR INJECTION MOULDING
Filed March 22, 1966  2 Sheets-Sheet 2

INVENTOR
ROBERT NOUEL
BY
ATTORNEYS

United States Patent Office 3,398,436
Patented Aug. 27, 1968

3,398,436
AUTOMATIC REGULATOR VALVE FOR INJECTION MOULDING
Robert Nouel, Villejuif, France, assignor to Inventions Finance Corporation, a corporation of Delaware
Continuation-in-part of applications Ser. No. 171,878, Feb. 8, 1962, 273,144, Apr. 15, 1963, and 289,173, June 18, 1963. This application Mar. 22, 1966, Ser. No. 536,472
3 Claims. (Cl. 18—30)

ABSTRACT OF THE DISCLOSURE

The disclosure provides an automatic regulator valve for injection moulding comprising an injection nozzle having an orifice and adapted to be secured to an injection chamber, a valve member slidable to open and close said orifice, said valve member being formed as a hollow needle providing a conduit for flow of moulding material from the injection cylinder to said nozzle, said valve member having cross-sectional areas of different size and acting as a differential piston on which the pressure of the moulding material causes movement of the valve member in one direction, fluid pressure control means operatively associated with the valve member for moving the valve member in the opposite direction, said control means including a lever connected to the valve member by a yoke bearing against an abutment collar surrounding the valve member, and through which said yoke the valve also slides, and an adjustable presetting means operatively associated with said control means for presetting the control means to limit the opening movement of said valve member to a selected distance.

---

This application is continuation-in-part of my application Ser. No. 171,878, now Patent No. 3,241,191; Ser. No. 273,144, now Patent No. 3,296,353, and Ser. No. 289,173, now Patent No. 3,241,192.

This invention relates to an automatic regulator for injection moulding.

It an object of the present invention to provide a regulator which has considerable advantages as regards the flow of plastic material from the injection cylinder into the mould of an injection moulding machine.

It is another object of the present invention to provide a regulator in which the opening and closing movement of the nozzle valve is performed under the control of an adjustably preset hydraulic device, and not under the control of the back pressure in the mould.

A further object of the invention is to avoid the accumulation of the plastic material during its travel from the injection cylinder to the injection nozzle.

According to the present invention, there is provided an automatic regulator for injection moulding comprising an injection nozzle, a valve closure member movable to open and close said nozzle, fluid-pressure control means operatively associated with said valve closure member for controlling said valve closure member, and adjustable presetting means operatively associated with said control means for presetting said control means to control the degree of opening of said closure member.

Figure 1:
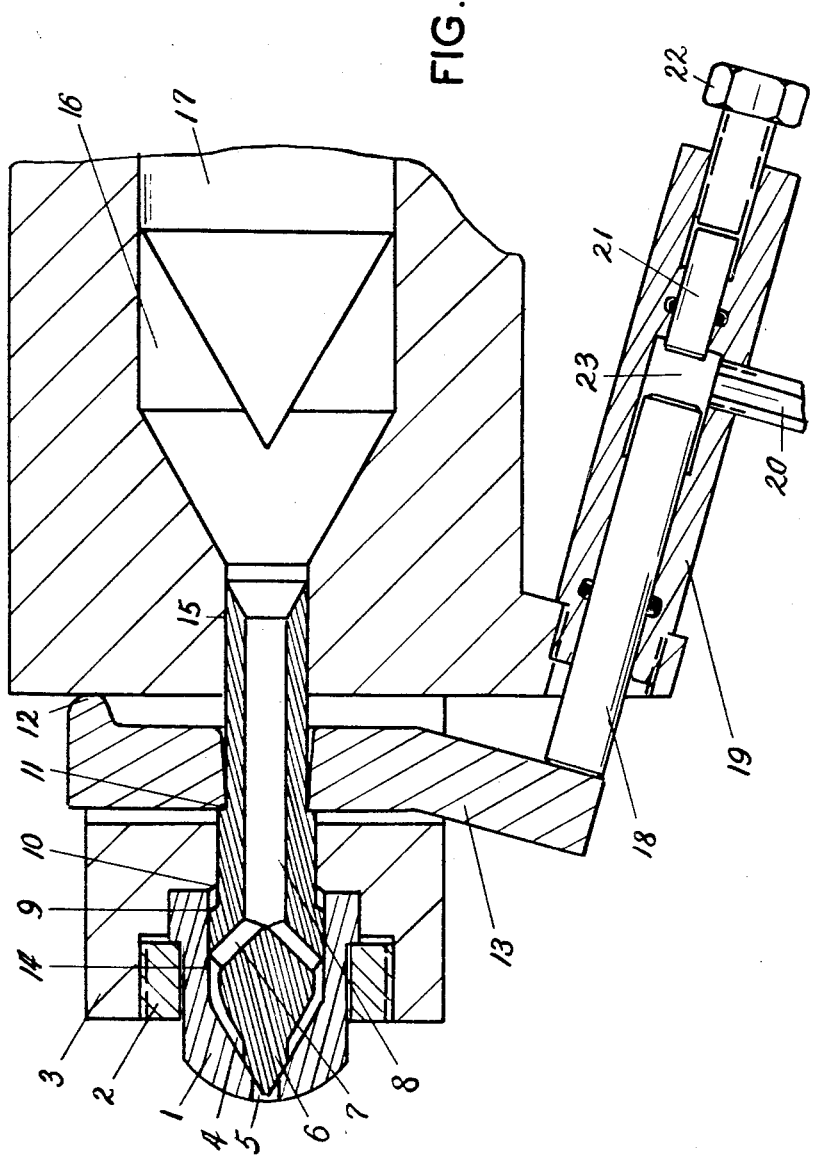
Figure 2:
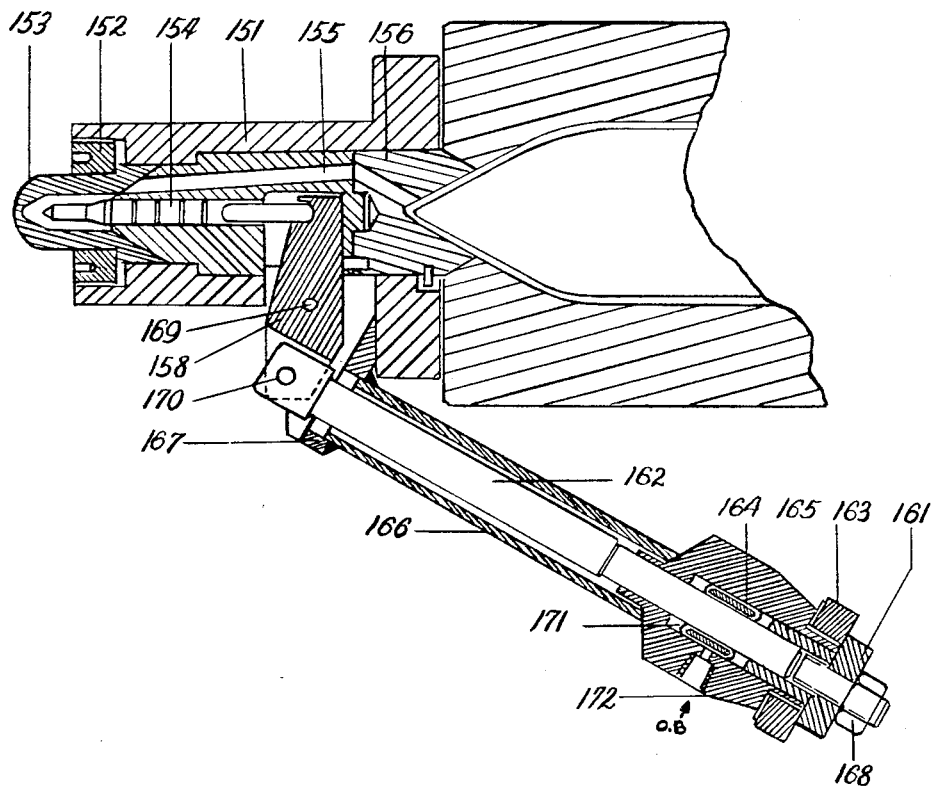

In order that the invention may be clearly understood and readily carried into effect, reference will now be made, by way of example, to the accompanying drawing, in which:

FIGURE 1 shows an axial section through a regulator of an injection moulding machine, and FIGURE 2 shows an axial section through a modified version thereof.

Referring to the drawing, the machine includes a nozzle assembly consisting of a nozzle 1 held in a support body 3 by means of a lock nut 2. Extending into the nozzle 1 from above is a hollow needle 6 arranged both to close the nozzle mouth 5 and to regulate the flow of plastic material into the mould. The plastic material flows from the injection cylinder through a conduit 8 provided by the hollow interior of the needle, and then through smaller-diameter ducts 7 formed transversely of the needle, to the nozzle chamber 4. The needle 6 slides in guiding bores 14 and 15 formed in the nozzle 1 and the injection cylinder 16, respectively. A shoulder 10 of the body 3 co-operates with a shoulder 9 of the needle to limit upward movement of the needle relatively to the nozzle. A lever 13 is formed with a hole through which extends the needle 6, the needle 6 is formed with a shoulder 11 on which bears the lever 13 surrounding the needle. A rounded projection 12 of the needle 6 serves as a fulcrum for the lever 13 on the injection cylinder 16. The lever 13 serves to push the needle 6 downwardly to close the nozzle. The lever 13 itself extends through an opening in the body 3. A piston 18 of a piston-and-cylinder device 18, 23 acts on the end of the lever opposite to the projection 12. Adjustment of the degree of opening of the needle 6 is obtained by means of a bolt 22 acting through a stop 21 to adjust the stroke of the piston 18. The parts 18, 20 and 21 are mounted in a body 19, to which leads a hydraulic line 20 connected to the cylinder 23. The body 19 is anchored to the injection cylinder 16. An injection piston 17 is shown diagrammatically in the drawing, although the piston could be replaced by a direct screw, a valve-type screw, or by any other means of injection.

In the drawing, the machine part is shown with the nozzle in the closed position, i.e., pressure is applied via the line 20 to the piston 18 to cause the needle 6 to close the nozzle mouth 5.

When injection is about to take place, the hydraulic pressure is removed from the piston 18 and the piston 17 is advanced. On advance of the piston 17, the pressure on the plastic material is transmitted to the chamber 4. The plan area of those upwardly facing surfaces of the needle on which acts the plastic material is less than the plan area of those downwardly facing surfaces of the needle 6 on which acts the plastic material, i.e., the needle acts in the manner of a differential piston and moves upwardly under the pressure of the plastic material. The extent of this upward movement is controlled by the pre-setting of the bolt 22. The return of the needle to its closed position is brought about by reimposition of the hydraulic pressure in the cylinder 23.

In this machine part described, the path followed by the plastic material is practically direct, so that accumulation of material is avoided. In addition, the arrangement is easy to dismantle and reassemble, because the lock nut 2 merely has to be unscrewed to dismantle the parts 1, 6 and 13.

Referring to FIGURE 2, in this nozzle, a needle blocks the opening in the end of the nozzle 153 either completely (closure) or partially (injection).

Such partial opening enables the injection speed to be controlled.

Opening is obtained by unscrewing the nut 163 to a greater or lesser extent. The nut itself acts as a mechanical stop.

Operation is extremely simple. During the injection cycle, the needle receives a thrust provided by the pressure of the plastic material on one side only. The needle 154 pushes the lever 158 which pivots about a spindle 169. The movement is reversed and pulls the spindle 162 pivotally mounted at 170. This spindle drives the piston nut 161 which is screwed *above* and kept in position by a lock nut 168. The piston nut 161 comes into contact with the adjusting nut 163 which to a greater or lesser extent limits the return stroke of the needle which is mechanically connected to the assembly. To lower the injection rate, it is sufficient to shorten the visible distance between the piston nut 161 and the abutment screw 163.

During the closure cycle, the procedure is reversed by applying the hydraulic pressure at OB, so that the piston nut 161 pulls the rod 162, the movement being reversed with the rod 158. The needle moves forward and blocks the orifice.

I claim:

1. An automatic regulator for injection moulding comprising an injection nozzle having an orifice and adapted to be secured to an injection chamber, a valve member slidable to open and close the injection orifice, said valve member being a hollow needle the hollow interior of which provides a conduit for flow of moulding material from an injection cylinder to said nozzle, said valve member having cross-sectional areas of different size subjected to the pressure of the moulding material during moulding injection and acting as a differential piston on which the pressure of the moulding material produces a force which moves the valve member in one direction, fluid pressure control means operatively associated with said valve member for moving said valve member in the opposite direction, said control means including a lever connected to said valve member by a yoke portion bearing against an abutment collar surrounding the valve member, and through which yoke portion the valve member also slides, and adjustable pre-setting means operatively associated with said control means for presetting said control means to limit the movement of opening of said valve member to a selected distance.

2. A regulator according to claim 1 in combination with an injection chamber for delivery of moulding material to said nozzle, the hollow interior of said needle forming the sole conduit for flow of moulding material from the injection chamber to the nozzle.

3. Regulator according to claim 1, wherein said control means comprises a hydraulic piston-and-cylinder device acting on said valve closure member, and said presetting means comprises a stop in said piston-and-cylinder device for presetting the stroke of said piston.

References Cited

UNITED STATES PATENTS 3,295,169  1/1967  Moslo _____ 18—30

FOREIGN PATENTS 762,262  7/1962  Japan.
911,028  11/1962  Great Britain.

WILBUR L. McBAY, *Primary Examiner.*